May 8, 1928.
E. LIVINGSTON
LITTER HANDLING MECHANISM
Filed March 10, 1926 2 Sheets-Sheet 1
1,668,815
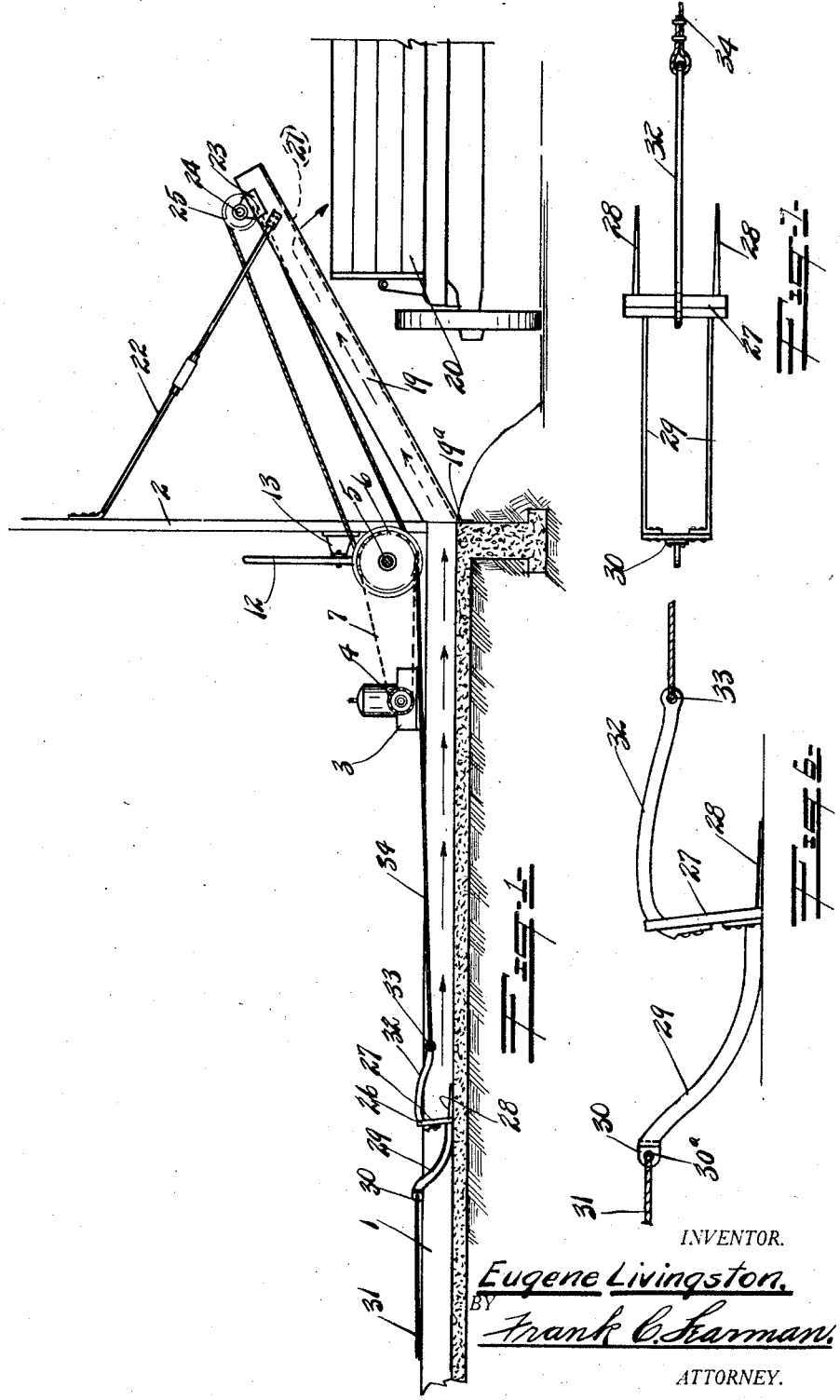
INVENTOR.
Eugene Livingston,
BY Frank C. Fearman.
ATTORNEY.

May 8, 1928.
E. LIVINGSTON
1,668,815
LITTER HANDLING MECHANISM
Filed March 10, 1926　　2 Sheets-Sheet 2
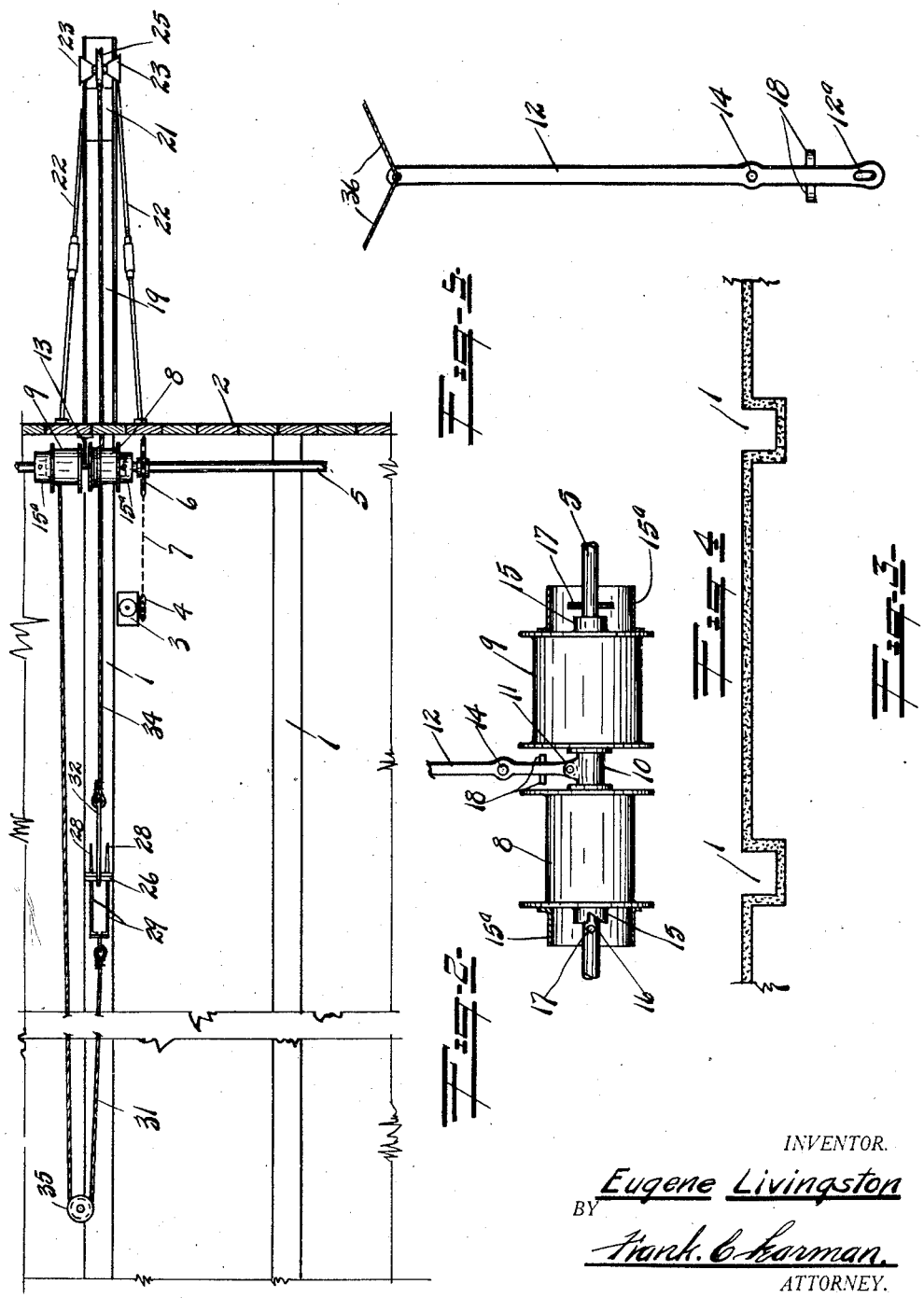
INVENTOR.
Eugene Livingston
BY
Frank C. Korman
ATTORNEY.

Patented May 8, 1928.

1,668,815

UNITED STATES PATENT OFFICE.

EUGENE LIVINGSTON, OF CASS CITY, MICHIGAN.

LITTER-HANDLING MECHANISM.

Application filed March 10, 1926. Serial No. 93,584.

This invention relates to litter handling mechanism, and particularly to a mechanism for use on dairy farms where litter troughs are provided in the building.

One object of the invention is to provide means whereby the mechanism may be drawn in either a forward or reverse direction, to the end that it will not be necessary for the operator to manually haul the forked shoe or bucket back each time a load is pushed out of the building.

Another object is to provide a simple, durable, and economical power operated mechanism which has no fine intricate parts, and in which replacements or repairs can be readily made.

A further object is to design a simple and efficient forked bucket which will automatically stay in the trough, and which is very easy to manipulate.

With the above and other objects in view, the present invention consists in the combination and arrangement of parts hereinafter more fully described, illustrated in the accompanying drawings, and particularly pointed out in the appended claims, it being understood that changes may be made in the form, size, and proportion of the different parts, without departing from the spirit or sacrificing any of the advantages of the invention.

In the drawings:

Fig. 1 is a fragmentary part sectional view of a dairy barn showing my improved litter handling device in place therein, the section being taken through one of the troughs.

Fig. 2 is a fragmentary floor plan of a dairy barn showing my improved mechanism installed therein.

Fig. 3 is a transverse sectional view through the troughs.

Fig. 4 is an enlarged view of the winding drums and shifting mechanism, the cylindrical guards being shown in section.

Fig. 5 is a front view of the shifting lever.

Fig. 6 is an enlarged side view of the bucket device.

Fig. 7 is a top plan view thereof.

Referring now particularly to the drawings in which I have shown the preferred embodiment of my invention, the numeral 1 indicates the troughs formed in the floor of the building designed for this purpose, and while in the present instance I have shown the mechanism installed to handle litter in but one trough, it will be readily understood that any number of troughs can be similarly equipped.

The front wall of the building is indicated at 2, and a suitable power plant 3 is anchored to the floor adjacent the trough, and in the position as shown, this is preferably a gasoline engine, but it can be in the form of an electric motor if desired, a sprocket 4 being keyed to the crank shaft thereof to transmit power as required.

A line shaft 5 extends transversely of the troughs and is journaled in suitable bearings (not shown) and which are secured to the wall 2, and a sprocket 6 is mounted on this shaft and is adapted to be driven from the sprocket 4 by means of suitable chain 7, winding drums 8 and 9 respectively being loosely mounted on the shaft 5, and are connected together by means of a flanged member 10, said member being formed with a lip 11 to which one end of a shifting lever 12 is pivotally connected, this end being slotted as shown at 12ª for a purpose to be presently described, said lever being pivotally connected to a stationary bracket 13 at the point 14, so that movement of the upper end of the shifting lever 12 will automatically shift the drums longitudinally on the shaft, the slotted opening 12ª permitting a limited range of movement.

The outer end of each drum has a hub 15 cast integral therewith, and each hub is formed with a jaw 16 which is adapted to engage a pin 17 anchored in the shaft, and which together with the member 15 forms a clutch, so that by shifting the drums on the shaft, one or the other thereof will be engaged and will be driven accordingly, sheet metal cylindrical members 15ª being secured to the end of each drum and prevents the operator's clothing being caught by the pins. Small lugs 18 are formed on the sides of the shifting lever in the position as shown and are adapted to engage the drum flange when the shifting lever is shifted to move the drum out of engagement with the pin. This acts as a brake on the released drum and prevents unwinding of the cable.

An adjustable trough 19 is provided on the outside of the building and is hingedly connected thereto at the point 19ª. This projects upwardly at an angle to allow a wagon 20 to drive thereunder, an opening 21 being provided in the trough and through which the litter is discharged into the wagon, adjustable stays or tie rods 22 are secured to the trough and building respectively to hold the trough in position, and brackets 23 are secured to the sides of the trough near the outer end, and in which a short shaft 24 is mounted, a suitable sheave 25 being mounted on the shaft, and over which a cable is trained in a manner to be presently described.

The bucket 26 comprises a substantially vertically disposed back member 27, having a plurality of spaced apart tines 28 rigidly secured thereto, and which are adapted to slide on the floor of the trough, a curved shoe being secured to the back of the member 27 by means of bolts or the like, and comprises spaced apart bar members 29, the lower ends being secured to the back, the upper ends being turned and are secured together by means of a transversely disposed bar, having a centrally disposed clip 30 secured thereto, said clip being provided with an opening 30ª to which one end of the cable 31 is secured.

A draw bar 32 is secured to the member 27 and this is also provided with an opening 33 to which one end of the cable 34 is attached, said cable leading forwardly under the drum 8 and is trained over the sheave 25, thence returning and being wound on the drum 8. The cable which is anchored to the shoe leads to the rear of the building and around a sheave 35, thence leading to and being wound on the backing drum 9.

The bucket will clean about a ten foot section of trough at each load, the bucket being placed in the trough in the rear of the first ten foot section of litter, the drum 8 is shifted into engagement with the pin 15 by means of the lever 12, and the bucket is pulled ahead, sliding the litter before it. When this load has been discharged through the opening 21, the shifting lever is manipulated to release the drum 8 and shift the backing drum 9 into driving relation with the driving shaft. The bucket is then pulled in the opposite direction, and placed behind another section of litter, which is moved in a similar manner. This is repeated until the entire trough is cleaned.

Overhead wires or central cables 36 can be connected to the shifting lever so that the mechanism may be manipulated from any place along the length of the trough, and the outside trough may be extended so that the litter may be deposited in the yard, at any reasonable distance from the building.

The mechanism is such that it is easily repaired, installed and operated, and there is no intricate parts to get out of order, and which cannot be repaired without the services of a machine shop.

From the foregoing description it will be obvious that I have perfected a very simple, inexpensive and substantial litter disposal mechanism for moving litter in troughs.

What I claim is:—

1. A bucket for handling litter comprising a substantially vertically disposed solid back member, tines secured to the bottom thereof and projecting therefrom, a draw bar secured to said back and projecting over the top thereof, a curved shoe secured to the back of the bucket, and adapted to ride on the bottom of a trough, and a cable connected to the free end of said shoe.

2. A litter bucket having a substantially vertical solid back member adapted to fit a trough, spaced apart tines secured to the lower end thereof and projecting therefrom, a draw bar secured to the back and projecting over the top thereof, a curved shoe secured to the rear of the bucket at the bottom thereof, and openings in the free ends of the shoe and draw-bar for connecting a cable thereto.

In testimony whereof I hereunto affix my signature.

EUGENE LIVINGSTON.